Oct. 29, 1940.  C. E. MILLER  2,219,694
MACHINE FOR MAKING SHAFTS
Filed June 7, 1939  3 Sheets-Sheet 1
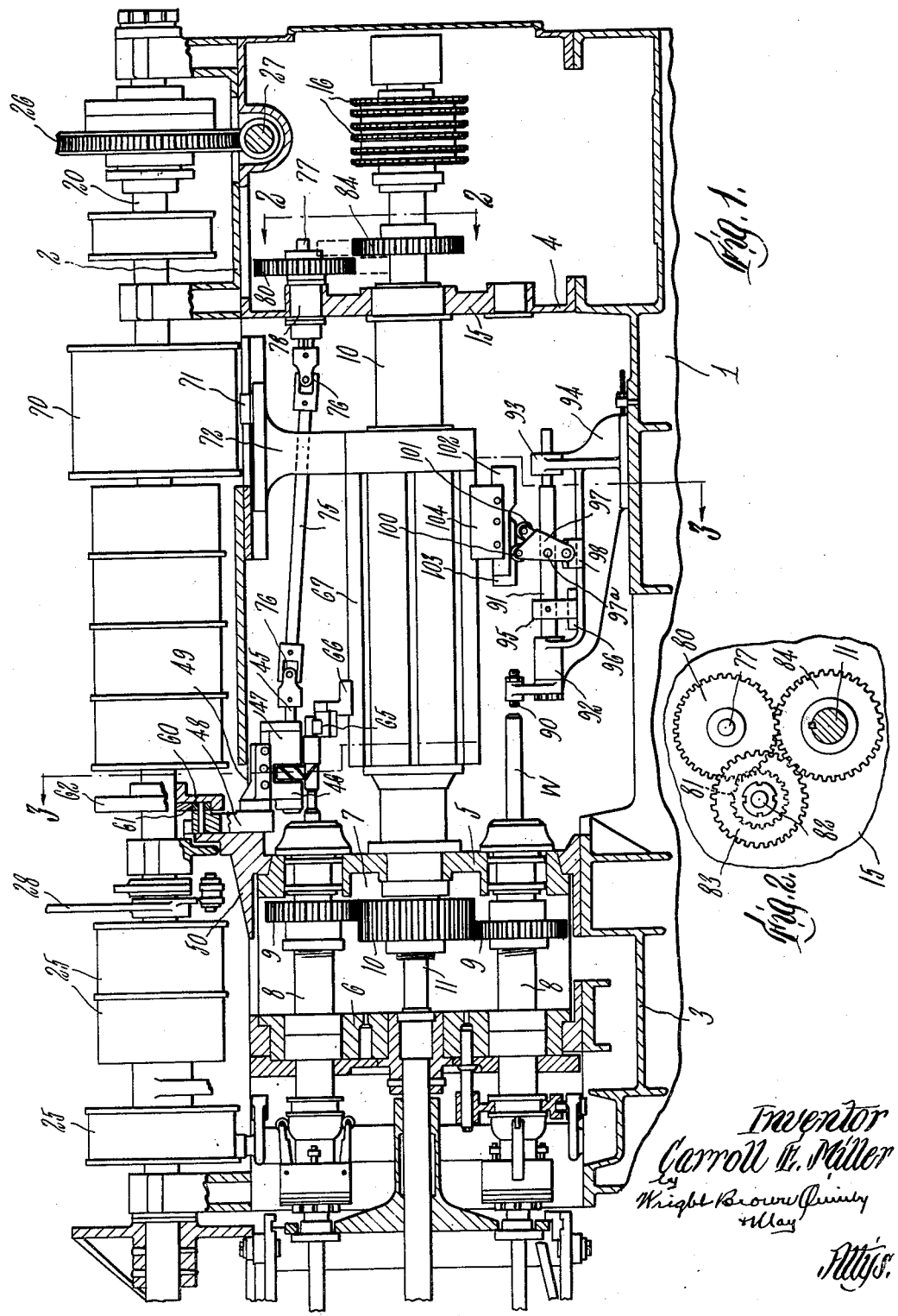
Inventor
Carroll E. Miller
by Wright, Brown, Quinby & May
Attys.

Oct. 29, 1940.  C. E. MILLER  2,219,694
MACHINE FOR MAKING SHAFTS
Filed June 7, 1939   3 Sheets-Sheet 2
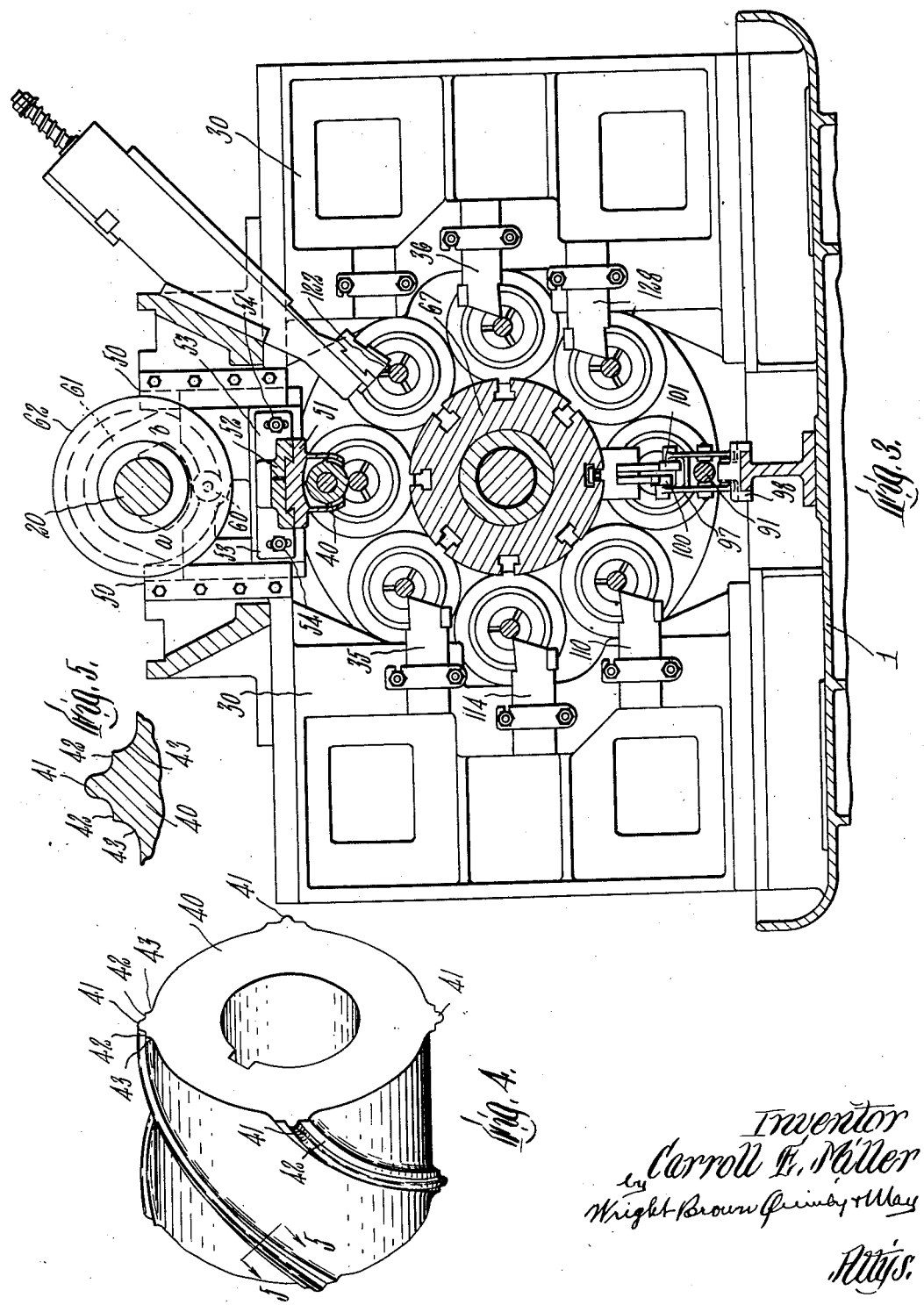

Oct. 29, 1940.　　　C. E. MILLER　　　2,219,694
MACHINE FOR MAKING SHAFTS
Filed June 7, 1939　　　3 Sheets-Sheet 3
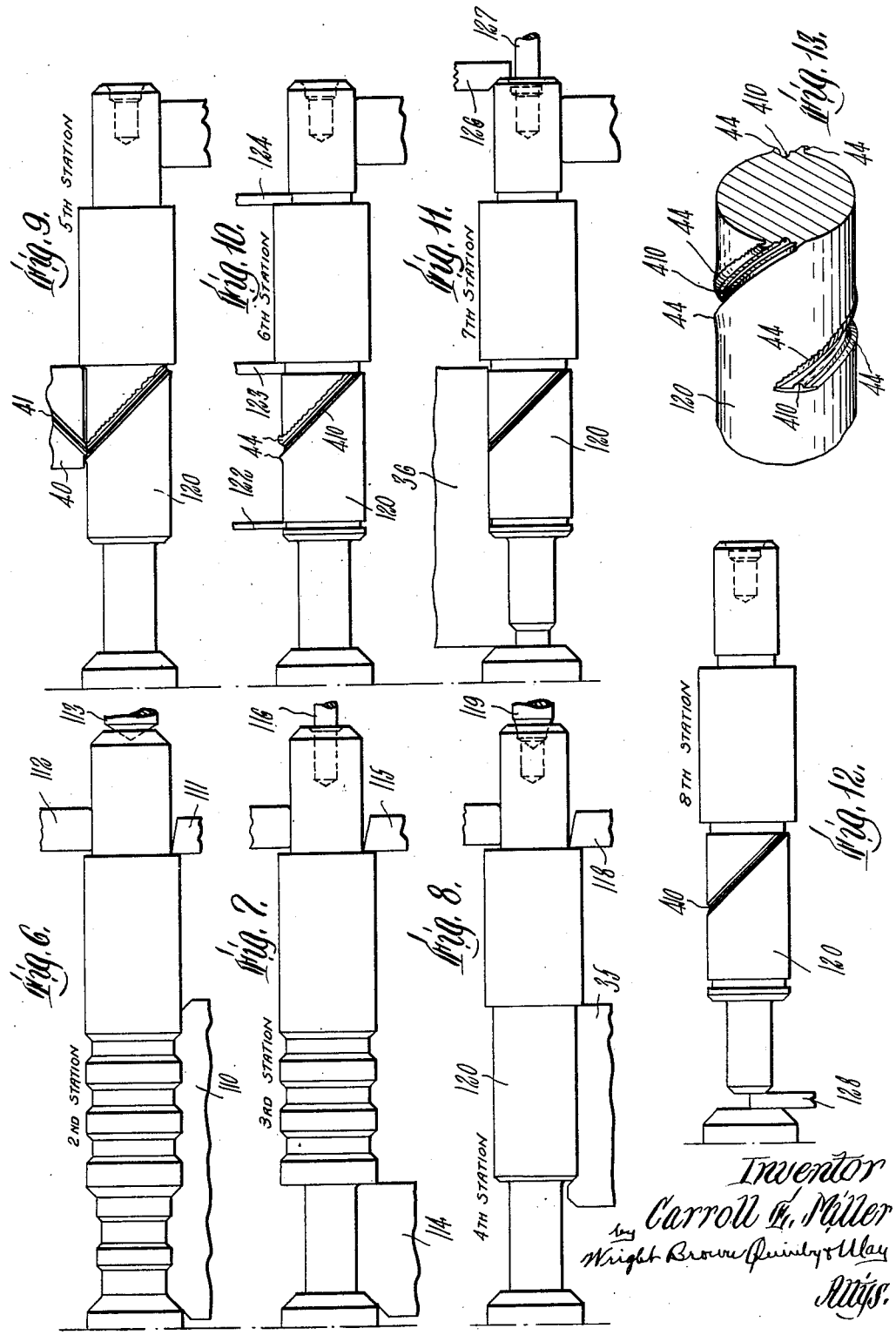

Patented Oct. 29, 1940

2,219,694

UNITED STATES PATENT OFFICE 2,219,694

MACHINE FOR MAKING SHAFTS

Carroll E. Miller, Windsor, Vt., assignor to Cone Automatic Machine Company Inc., Windsor, Vt., a corporation of Vermont Application June 7, 1939, Serial No. 277,827

4 Claims. (Cl. 29—37)

In making shafts provided with lubricant grooves in their bearing faces, it has been a practice to rough turn the shaft in a lathe, then remove it and roll the groove into its surface in a special machine under very heavy pressure. The piece is then returned to the lathe, again turned, then removed from the lathe, and then ground to finished size. This method requires much handling and transferring of the work from one to another machine, which is both time consuming and costly.

An object of the present invention, therefore, is to eliminate excessive work handling, the rolling operation being performed while the work remains in the lathe in which the turning operations are performed.

To this end the various machining operations are performed in a multiple spindle automatic lathe, the groove rolling being done at a station intermediate turning stations.

For a more complete understanding of this invention, reference may be had to the accompanying drawings in which Figure 1 is a fragmentary central vertical section through a multiple spindle automatic lathe of the general type shown in my Patent No. 2,130,809, granted September 20, 1938, and to which the subject matter of this invention is shown as applied.

Figures 2 and 3 are detail sections on lines 2—2 and 3—3, respectively, of Figure 1.

Figure 4 is a perspective view of the tool for forming the grooves in the work.

Figure 5 is a detail section on line 5—5 of Figure 4.

Figures 6 to 12, inclusive, are tooling diagrams for various stations.

Figure 13 is a fragmentary perspective view of the work just after the groove-rolling operation.

Referring first to Figures 1 and 3, the machine shown is an eight-spindle automatic lathe. This lathe comprises a lower bed 1, an upper bed 2 and spaced columns 3 and 4 extending between these beds. Within the column 3 is mounted a rotatable turret 7 having spaced end walls 5 and 6 within which are journaled the several work-holding spindles 8. As shown best in Figure 1, each of these spindles has fixed thereto a gear 9 which meshes with a driving gear 10 on a central shaft 11. This shaft extends through a tubular member 12 which is supported at one end by the turret end wall 5 and is journaled at its other end in the end wall 15 of the column 4. Within the column 4 the shaft 11 carries a series of sprocket wheels 16 by which it may be driven.

The column 4 may contain the machine driving mechanism as shown more in detail in my Patent No. 2,130,809 to which reference has heretofore been made.

The upper bed 2 carries suitably journaled therein a cam shaft 20 to which are secured the various cam drums 25 which carry cams (not shown) for actuating various parts of the machine as more fully shown in Patent No. 2,130,809. The shaft 20 is driven as by the worm gear 26 and worm shaft 27, and besides carrying the cam drums, it also carries an indexing arm 28 (partly broken away) by the rotation of which the spindle-carrying turret is indexed from one to a succeeding station, as is shown in my patent hereinbefore mentioned.

As shown in Figure 3, there may be side tool carriers 30, the motion of which may be controlled by suitable cams on the cam drums, as shown in my patent, and as shown herein in Figures 8 and 11 sets of turning tools at 35 and 36 may be suitably supported for turning work at stations 4 and 7. At station 5 the groove-rolling operation may be performed. The tool for performing this operation is shown detached in Figure 4, being in the shape of a hardened roll 40 having grooving ribs 41 arranged in spiral formation thereon. As shown best in Figure 5, these ribs 41 flare outwardly at their bases to form the shoulders 42 beyond which are formed the recesses 43. The shoulders 42 define the normal diameter of the completed shaft and indicate on the rolled work the amount to be removed by subsequent operations. These recesses 43 allow room for the metal flowed out from the work by the rolling operation, such metal being shown in Figure 13 as the marginal ribs 44 on either side of the central groove 410. The tool 40 is shown as keyed to a drive shaft 45 mounted in bearings 46 and 47 (see Figure 1). These bearings are secured to a slide 48 extending through a slot 49 in the upper bed along upright guide members 50.

For the purpose of adjustment the bearings 46 and 47 may be carried by a horizontal slide 51 (see Figure 3) in a block 52 provided with slotted wings 53 through which pass screws 54 to adjustably fix the block 52 in position on the slide 48. This slide 48 works between the oppositely disposed guides 50 and at its upper end the slide 48 is provided with a cam roller 60 which engages in a cam groove 61 in a cam 62 secured to the cam shaft 20. This groove is so shaped that as the cam revolves, the slide is forced downwardly to an operative position during which it remains throughout an angular motion of the cam shaft between *a* and *b*, after which the slide is lifted into inoperative position, during which time the work is indexed to bring successive pieces of work on the various work spindles in position therebeneath. The thrust of the groove-rolling tool on the work is partly taken up by the work spindle and partly by a supplemental bearing 65 carried by a bracket 66 which may be secured to a tool support 67 mounted for sliding motion on the tubular member 12. This support 67 may be employed to receive various end working tools as is disclosed in my Patent No. 2,130,809 and its axial position may be controlled by cams (not shown) on the cam drum 70, these acting on a follower roll 71 on a slide 72 secured to the rear end portion of the tool support 67.

The grooving roll is rotated in time with the rotation of the work spindle, and for this purpose the shaft 45 on which it is mounted is connected through a shaft 75, and a pair of universal joints 76, to a shaft 77 journaled in a bearing 78 in the wall 15 of the column 4. This shaft 77 has fixed thereto a gear 80 which is driven by a pinion 81 (see Figure 2) on a jack shaft 82. This pinion 81 has connected to rotate therewith a gear 83 which meshes with a gear 84 secured to the main shaft 11.

As shown in Figure 1 the work W in the form of bar stock is fed into the various work spindles at the first station, which is directly beneath the shaft 11 where the length to be worked upon is measured off by the stock stop 90. This stop is shown as fixed to a bar 91 mounted for axial motion in bearings 92 and 93 of a bracket 94 adjustably secured to the top face of the lower bed 1. This bar 91 is provided with a guide block 95 working between guide lugs 96 to hold it against rotary motion and it is advanced and retracted by the rocking of a double lever 97 fulcrumed to a boss 98 carried by the bracket 94 and pivoted to the bar 91 at 97a. This lever carries at its upper end a pair of spaced cam rolls 100 and 101 arranged in the paths of motion of a pair of actuating cams 102 and 103 which are secured to a block 104 fixed to the support 67. As this support is moved to the left as viewed in Figure 1, the actuating cam 102 contacts with the roller 100 and moves the stock stop to the left into operative position, while on the retraction of the tool support 67 the cam 103 engages the roller 101 and rocks the lever 97 in the opposite direction and retracts the stock stop.

Figures 6 to 11 show various operations which may be performed between the second and seventh stations of the machine. For example, in Figure 6 the work is shown in the second station, wherein the forming tool 110 is breaking down the surface of one end portion of the stock projecting from the work spindle, and the tool 111 is turning the opposite end portion, a roll support 112 being employed to take the thrust from the tool 111. The outer end of the bar is being spot drilled at this station as by the drill 113. In the third station (Figure 7) the turning of the left hand portion with the forming tool 114 is being done and also further turning is accomplished by the tool 115 at the right hand end, and the right hand end is also being drilled by the end drill 116. At the fourth station (Figure 8) the left hand portion is being turned by the forming tool 35, the right hand portion by the turning tool 118, and a centering tool 119 is working on the right hand end.

The portion of the stock 120 which was turned at the fourth station by the forming tool 35 is subjected to the grooving operation at the fifth station, as shown in Figure 9, the rib 41 of the roll 40 being forced down into the surface of the work and acting to displace the metal on either side as shown best in Figure 13. The work then passes to the sixth station (Figure 10) at which the grooving tools 122, 123 and 124 are brought into operation. At the seventh station shown in Figure 11, the material 44 rolled up from the work by the grooving roll is removed by the turning forming tool 36, the end of the work is faced and chamfered by the tool 126, and a final end drilling operation is accomplished by the drill 127. The work is then cut off at the eighth station as shown in Figure 12 by the tool 128. The work may then be subjected to a final grinding operation on the bearing face, which leaves in the portion 120 the desired lubricant-receiving groove. Ordinarily it will be found desirable to accomplish the final grinding operation in a separate grinding machine, rather than attempting to do this in the multiple spindle machine in which the turning and groove-rolling operations have been performed.

With a machine of this type, the work is sufficiently supported to withstand the heavy pressure required in the rolling operation without impairing the action of other parts of the machine or the accuracy of the work.

From the foregoing description of an embodiment of this invention and the method performed, it should be evident to those skilled in the art that various changes and modifications might be made without departing from the spirit or scope of this invention as defined by the appended claims.

I claim:

1. In a machine of the class described, a work-holding spindle, a turning tool, a groove-rolling tool, means for actuating said tools, means for rotating said spindle, and means for relatively moving said tools and spindle to roll a groove in the work and then turn the grooved face of the work while the work is held by said spindle.

2. In a machine of the class described, a spindle carrier, work spindles carried by said carrier, tools including a turning tool and a groove-rolling tool, means for rotating said spindles and said groove-rolling tool, spindle carrier indexing means, a cam shaft, cams on said shaft for controlling the cycle of operations of said machine, a rolling tool carrier movable toward and from work carried by a work spindle at one index station, a cam on said shaft for forcing and then relieving said groove-rolling tool against work carried by a spindle at said station, said turning tool being positioned at an index station after said rolling station to turn the grooved face of the work, and means for driving said cam shaft.

3. A machine of the class described, comprising upper and lower beds, spaced columns extending between said beds, a rotary spindle turret in one of said columns, a member extending between said columns coaxial with said turret, a plurality of rotary work spindles arranged in said turret in circular array about said axis, a support carried on said member, a cam shaft carried by said upper bed, a slide mounted for up and down movement and carried by said upper bed, a groove-rolling tool journaled in said slide with its axis substantially parallel to said frame axis and in position to operatively engage work carried by a work spindle in one index station, cam means actuated by said cam shaft for moving said slide to force said grooving tool toward and then relieve it from the work, means carried on said support with which the work at said index station engages in position to take thrust thereon from said grooving roll, and means for rotating said spindles and said grooving roll in timed relation.

4. A machine of the class described, comprising upper and lower beds, spaced columns extending between said beds, a rotary spindle turret in one of said columns, a tubular member extending between said columns coaxial with said turret, a plurality of rotary work spindles arranged in said turret in circular array about said axis, a support carried on said tubular member, a cam shaft carried by said upper bed, a slide mounted for up and down movement and carried by said upper bed, a groove-rolling tool journaled in said slide with its axis substantially parallel to said drum axis and in position to operatively engage work carried by a work spindle in one index station, cam means actuated by said cam shaft for moving said slide to force said grooving roll toward and then relieve it from the work, means carried on said support with which the work at said index station engages in position to take thrust thereon from said grooving roll, driving means in the other of said columns, connections from said driving means to rotate said grooving roll, and connections from said driving means extending through said tubular member for rotating said spindles, and connections from said driving means for rotating said grooving roll in timed relation to the rotation of said spindles.

CARROLL E. MILLER.